(12) United States Patent
Gudesen

(10) Patent No.: US 11,053,927 B2
(45) Date of Patent: Jul. 6, 2021

(54) UNDERGROUND ENERGY GENERATING METHOD

(71) Applicant: Hans Gude Gudesen, Lucerne (CH)

(72) Inventor: Hans Gude Gudesen, Lucerne (CH)

( * ) Notice: Subject to any disclaimer, the term of this patent is extended or adjusted under 35 U.S.C. 154(b) by 0 days.

(21) Appl. No.: 16/755,140

(22) PCT Filed: Oct. 2, 2018

(86) PCT No.: PCT/NO2018/050236
§ 371 (c)(1),
(2) Date: Apr. 9, 2020

(87) PCT Pub. No.: WO2019/074372
PCT Pub. Date: Apr. 18, 2019

(65) Prior Publication Data
US 2020/0325879 A1    Oct. 15, 2020

(30) Foreign Application Priority Data
Oct. 10, 2017    (NO) .................................. 20171614

(51) Int. Cl.
*F03G 7/04*    (2006.01)
*F24T 10/20*    (2018.01)
(Continued)

(52) U.S. Cl.
CPC ................ *F03G 7/04* (2013.01); *F03B 13/00* (2013.01); *F03B 13/06* (2013.01); *F03B 13/10* (2013.01);
(Continued)

(58) Field of Classification Search
CPC ... F03G 7/04; F24T 10/20; F24T 10/30; F24T 2010/56; F24T 50/00; Y02E 10/20; F05B 2220/703; F03B 15/04; F03B 15/06; F03B 15/08; F03B 15/14; F03B 15/16; F03B 13/06; F03B 13/08; F03B 13/10
(Continued)

(56) References Cited

U.S. PATENT DOCUMENTS 3,974,394 A * 8/1976 Bailey ..................... F24T 10/10
290/44
4,255,933 A * 3/1981 Bailey ...................... F03G 7/04
60/641.2
(Continued)

FOREIGN PATENT DOCUMENTS

CN      201802547 U      4/2011
DE    102014107034 A1 * 11/2015   .............. F24T 10/10
(Continued)

OTHER PUBLICATIONS

English language Abstract of CN 201802547 U (Apr. 20, 2011).
(Continued)

*Primary Examiner* — Mark A Laurenzi
*Assistant Examiner* — Mickey H France
(74) *Attorney, Agent, or Firm* — Hershkovitz & Associates, PLLC; Abraham Hershkovitz

(57) ABSTRACT

A method for generating underground energy using water from a water mass above an underground recipient is disclosed. The method comprises two modes; namely a 5 hydroelectric mode and a thermal mode, and steps for switching between the modes.0

20 Claims, 6 Drawing Sheets

(51) Int. Cl.
  F03B 13/06 (2006.01)
  F03B 13/10 (2006.01)
  F03B 13/00 (2006.01)
  F24T 50/00 (2018.01)

(52) U.S. Cl.
  CPC .............. F24T 10/20 (2018.05); F24T 50/00 (2018.05); *Y02E 10/10* (2013.01); *Y02E 10/20* (2013.01); *Y02E 60/16* (2013.01)

(58) Field of Classification Search
  USPC .............................................. 60/641.2–641.6
  See application file for complete search history.

(56) References Cited

U.S. PATENT DOCUMENTS

| | | | |
|---|---|---|---|
| 2010/0052326 A1 | 3/2010 | Jonsson | |
| 2010/0077749 A1* | 4/2010 | Riley | F24T 10/10 60/641.2 |
| 2011/0247328 A1* | 10/2011 | DuBois | F03D 9/25 60/641.3 |
| 2013/0283791 A1* | 10/2013 | Riley | F03G 7/04 60/641.2 |
| 2014/0013744 A1* | 1/2014 | Burkhardt | B09B 1/002 60/641.2 |
| 2015/0285226 A1 | 10/2015 | Archambeau | |
| 2018/0100491 A1* | 4/2018 | Willimczik | F24T 10/10 |

FOREIGN PATENT DOCUMENTS

| | | |
|---|---|---|
| EP | 2420668 A2 | 2/2012 |
| JP | 2013136969 A * | 7/2013 |
| WO | WO 2008/072262 A1 | 6/2008 |

OTHER PUBLICATIONS

Gregory D. Martin, "Aquifer Underground Pumped Hydroelectric Energy Storage", Thesis, University of Colorado at Boulder, 2007, URL: http://www.colorado.edu/engineering/energystorage/files/GDM_thesis_final.pdf.

E. Pujades et al., "Underground pumped storage hydropower plants using open pit mines: How do groundwater exchanges influence the efficiency?", Applied Energy 190, 2017, pp. 135-146.

T. M. Missimer et al., "Geothermal electricity generation and desalination: an integrated process design to conserve latent heat with operational improvements", Desalination and Water Treatment 57, 2016, pp. 23110-23118.

International Search Report in International Application No. PCT/N02018/050236, dated Nov. 30, 2018.

Written Opinion of the ISA in International Application No. PCT/NO2018/050236, dated Nov. 30, 2018.

* cited by examiner

UNDERGROUND ENERGY GENERATING METHOD

FIELD OF THE INVENTION

The present invention generally relates to generating hydroelectric power and extracting geothermal energy. More specifically it relates to a method and a system for generating underground energy using water from a water mass above an underground recipient.

BACKGROUND OF THE INVENTION

Underground pumped hydropower plants are known in the prior art. They are conceptually similar to aboveground pumped hydropower plants where energy is stored by pumping water to a water reservoir at a high elevation. When energy is needed, the water is returned to a turbine/generator combination at a lower level. In underground hydropower plants, the upper level reservoir needs not be located at high level aboveground, since water is delivered to the turbine at a level below the ground. A requirement for this is that the spent water from the turbine can be accommodated in an underground recipient of sufficient capacity. Examples of relevant literature are:

Gregory Martin: "Aquifer Underground Pumped Hydroelectric Storage for Agriculture" (http/www.colorado.edu/enqineering/energystorage/files/GDM thesis final.pdf) and E. Pujades et al.: "Underground pumped storage hydropower plants using open pit mines: How do groundwater exchanges influence the efficiency?"; Applied Energy 190 (2017) 135-146.

Geothermal energy harvesting for heating purposes, electricity generation and desalination are also well known. The heat energy is either captured at shallow depths near the surface in locations where natural geological processes deliver hot water and steam from the Earth's interior, or wells are drilled deep into the Earth's crust to access regions at elevated temperatures. Typically, the temperature rise is 15-30 degrees Celsius for every km. of depth. The heat transport fluid is generally water or brine which is injected into the underground heat reservoir and recovered via one or more wellbores connecting the reservoir with the surface. Alternatively, the heat transport fluid as superheated flows in a closed circuit in a tube which extends from the surface and loops through the underground heat reservoir. Examples of relevant literature are:

J. R. Archambeau et al.: US Patent Application US 2015/0285226 A1: "Geothermal energy production using a closed-loop heat exchange system", and T. M. Missimer et al.: "Geothermal electricity generation and desalination: an integrated process design to conserve latent heat with operational improvements"; Desalination and Water Treatment 57 (2016) 23110-23118.

The PCT application WO 200872262 A1 "Geothermal Energy System" describes a geothermal energy system utilizing a water turbine. Water is led into an underground chamber with a high ambient temperature for utilization of geothermal energy. A water turbine is arranged in the supply duct.

The European patent application EP 2420668 A2 "Turbo-generator device for generating energy in aquifer recharge and process associated therewith" describes a turbo-generator for utilizing flow energy by recharging an aquifer.

OBJECTS OF THE PRESENT INVENTION

Underground hydropower and deep underground geothermal energy harvesting have until now had only a small impact on the total global energy economy. The main reasons for this are ultimately economic, to a large degree deriving from the following:

Geographic constraints: The locations suitable as natural recipients for spent water from underground hydropower plants depend on local geology and need to be accurately determined at considerable depths below the Earth's surface. Exploitation of geothermal resources has traditionally been focused on locations where hot water and steam can be harvested at or near the Earth's surface, geographically limiting plant locations to geologically active zones.

Economic risk: Even when deep lying recipients for spent water from underground hydropower plants have been successfully located and connected to the surface via a borehole, there still exist a number of potential issues that may block exploitation: The volumetric capacity of the recipient may be limited, resulting in it being filled up after a short period of operation. The recipient may also be filled with high pressure water and gas from the local environment, blocking any further addition of water from above through the turbine. Facilities for energy production via deep geothermal heat sources shall also represent significant technical challenges and uncertainties, and thus investment risks. Hitherto, this appears to have been a strong deterrent factor blocking large scale exploitation of both types of resources.

Thus, there exists a need for reducing the technical and economic risks of establishing facilities for underground hydropower and deep geothermal energy.

SUMMARY OF THE INVENTION

An aspect of the present invention is a method comprising two modes for generating underground energy using water from a water mass above an underground recipient.

The method comprises the following steps: in a hydroelectric mode:
injecting water into an inlet of a first shaft extending from the water mass to the underground recipient and passing the water through a turbine, where the turbine drives an electrical generator,
measuring back pressure from the recipient,
switching to a thermal mode when the back pressure has built up to a defined back pressure level, in the thermal mode:
injecting water into the first shaft, forcing water in the recipient to exit through a second shaft extending from the recipient;
extracting thermal energy from the water transported via the second shaft, by at least one of the following: i) using the water directly for heating purposes, and ii) generating electrical power in a heat engine.

Optionally, the defined back pressure level is the level where further operation in hydroelectric mode is uneconomical.

A net pressure differential driving the turbine can be a hydrostatic pressure resulting from the water in the first shaft above the turbine minus a frictional pressure drop and minus a back pressure under the turbine from gas or liquid present in the recipient, and optionally the method can comprise the step of switching to the thermal mode when the net pressure differential is below a defined level. Optionally, before switching to the thermal mode, the method can comprise the step of verifying that the measured back pressure is maintained, and if it is not, adding sealant material to the water injected in the first shaft to stop leakage from the recipient.

Further, the step of verifying can comprise estimating the back pressure time gradient based on the measured back pressure, and moving to the step of adding if the back pressure time gradient is above a defined level.

The inlet of the first shaft can be arranged between the surface and the bottom of the water mass, and the inlet of the first shaft can be arranged either at the surface or the water bottom.

The turbine can be arranged either at bottom of the first shaft, in the first shaft or above the first shaft.

Optionally, the step of extracting thermal energy can comprise using a thermopower unit arranged either on land or on a floating facility at the surface of the water mass.

Optionally, the thermal mode can further comprises the following steps:
  condensing water vapor received via the second shaft, to freshwater, and
  collecting the freshwater.

The thermal mode further can comprise collecting salt for high value use or collecting particulates.

DESCRIPTION OF THE FIGURES

Embodiments of the present invention will now be described, by way of example only, with reference to the following diagrams wherein.

DESCRIPTION OF PREFERRED EMBODIMENTS OF THE INVENTION

Figure 1:
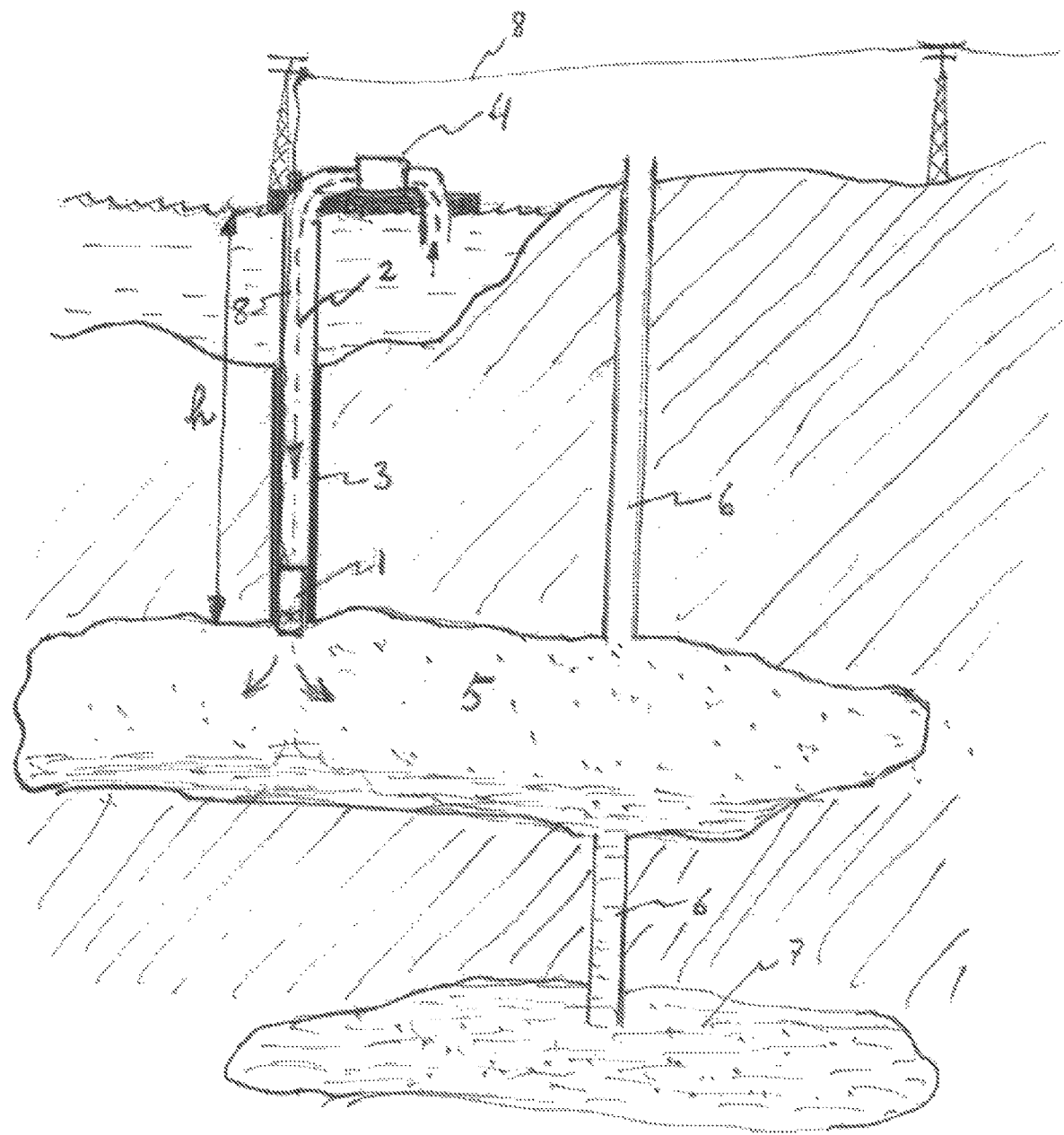
FIG. 1 discloses a first configuration for generating underground hydroelectric power, representing in part a first preferred embodiment of the present invention.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The present invention relates to extraction of energy from the underground, involving a sequence of two distinct but coupled operation modes:

In the first operation mode, termed the hydroelectric mode, water is injected from the surface through a vertical shaft to an underground recipient. A turbine coupled to an electrical generator is positioned near the bottom of the shaft to intercept the water flow and produce electrical power. The head of water driving the turbine corresponds roughly to the vertical height from the turbine and to the surface. Spent water through the turbine is sequestered in the recipient. In many cases, water filters away from the recipient through communicating channels or pores in the underground, and the recipient can receive virtually unlimited amounts of water without being filled up. If such a situation does not prevail, the recipient is gradually filled up with water and the turbine experiences a build-up of back pressure which ultimately renders further energy production uneconomical. The turbine and ancillary equipment is then retrieved by pulling it up the borehole, and energy extraction switches from hydroelectric to thermal:

In the second operation mode, termed the thermal mode, a second shaft from the surface to the recipient is brought into play, providing an outlet for excess water from the (now full) recipient. When water is filled into the upper opening of the first shaft, water in the recipient will be forced towards the second shaft and fill it up from below, ultimately ending up with a head of water matching that of the first shaft. By providing a moderate extra head of pressure at the first shaft, water will be forced to flow from the recipient and exit at the top of the second shaft. By proper arrangement of the shaft positions relative to the recipient geometry, this water shall have spent time in the recipient and acquired a temperature representative of the recipient environment. This temperature shall depend on geological conditions and depth below the surface, being typically in the range 100-250° C. at depths exceeding 1200-2000 m. Thus, by injecting surface water at ambient temperatures and at a moderate injection pressure through the first shaft, hot water can be produced from the second shaft. Due to the elevated water temperature and pressure conditions in the recipient, the water exiting through the second shaft shall partly convert to steam as it rises in the shaft and experiences reduced hydrostatic pressure. The lower density of the hot water in the second shaft, assisted by the gas lift effect of rising steam bubbles, shall reduce the need for injection overpressure of the cold water at the first shaft. The hot water exiting from the second shaft represents a thermal energy source which can be exploited in one or more of the following ways:

The energy can be extracted directly for various traditional heating purposes.

Water and steam can drive heat machines of various kinds, e.g. of the organic Rankine cycle type, to create electrical power. By maintaining the hot water and steam at pressures above ambient, relatively high temperatures and significant efficiencies may be achieved.

Since water from the second shaft maintains a temperature well above 100° C., it shall convert spontaneously to steam when reaching ambient pressure. Condensing the steam provides purified (distilled) water without dissolved salts or particulates.

Figure 2:
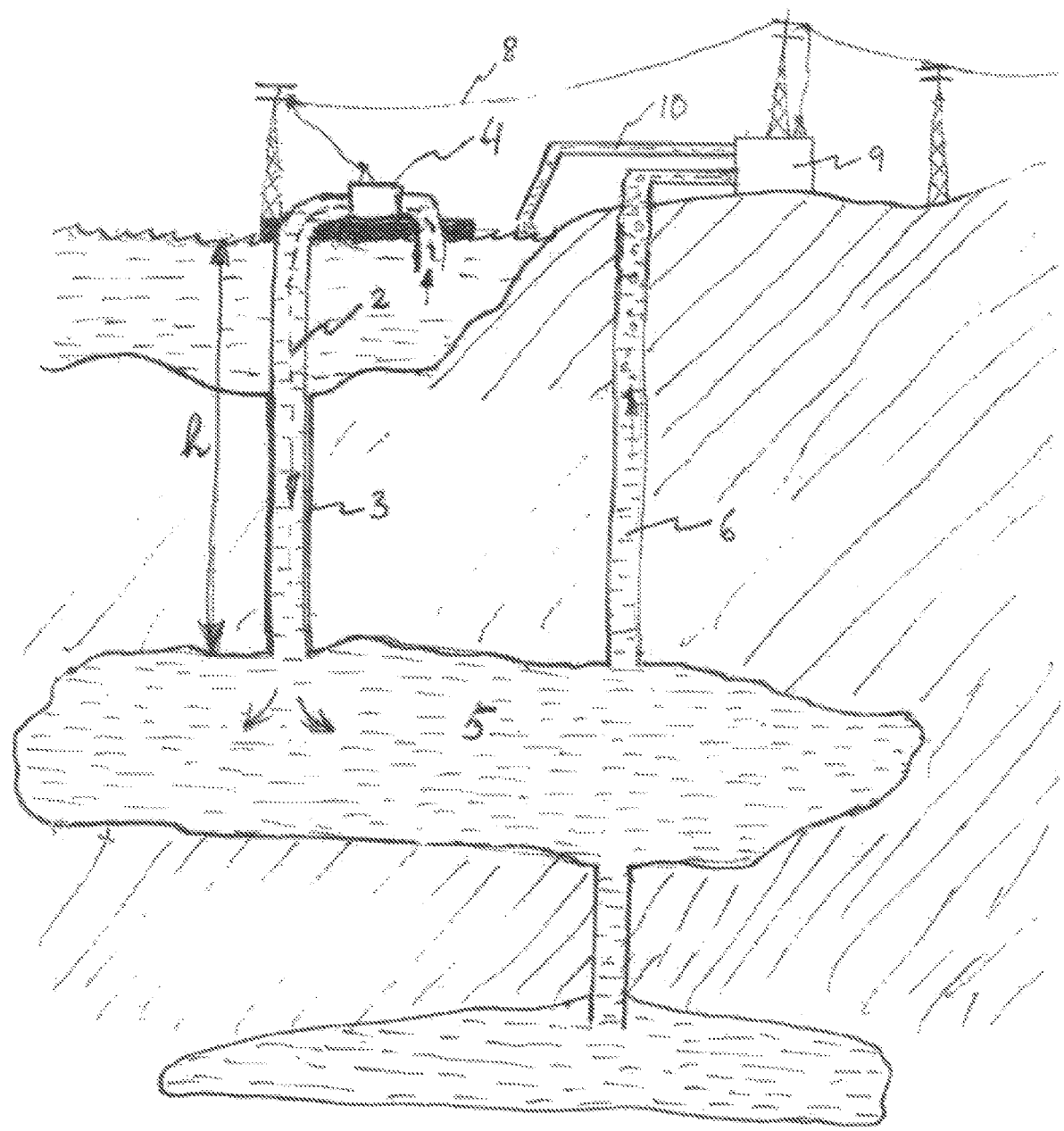
FIG. 2 discloses a second configuration for extracting geothermal energy, representing in part a first preferred embodiment of the present invention.

A more detailed description of the hydroelectric and thermal modes of operation shall now be given with reference to a first preferred embodiment of the present invention illustrated in FIG. 1 and FIG. 2:

Hydroelectric Mode

The basic principle is illustrated in FIG. 1: A water turbine/electric generator combination (1) is located at the exit of a water-filled vertical shaft (2) which is fitted into a drilled vertical hole (3) in the underground. Electricity is transported out of the facility by means of a transmission line (8). The water column in the tube extends a vertical distance h from the position of the turbine to a point at the top where water is supplied from a control facility (4). Hydrostatic pressure resulting from the water column in the tube is pi at the bottom of the tube, providing the force to operate the turbine, and water expelled from the turbine is deposited in a volumetric underground recipient (5), shown as a cavern in FIG. 1. In order to achieve a net energy production, the water exiting from the turbine should encounter a back-pressure $p_2$ (from gas or liquid present in the recipient) that is much less than $p_1$. This shall be the case in a wide range of cases involving natural geological structures. With a frictional pressure drop $p_{loss}$ in the tube, the net pressure differential driving the turbine is then:

$$\Delta p = p_1 - p_{loss} - p_2$$

Before progressing to a discussion of the practical aspects of a concept as shown in FIG. 1, a simple numerical example shall be given to illustrate the power potential:

EXAMPLE

Tube dimensions: Circular 40 cm. diameter, corresponding to $A=0.1256$ $[m^2]$ cross section, water column height $h=1200$ m., absolute internal wall roughness 0.01 [mm.]. Flow medium: water 20° C., turbulent flow, density 998.2 [kg./$m^3$], flow speed in tube $v=2.21$ [m/s] corresponding to a flow rate of $S=1000$ [$m^3$/h]. Pressure drop in tube: $p_{loss}=0.91$ [bar]$=0.91\times10^5$ [N/$m^2$]. Back-pressure (assumption) $p_2=20$ [bar]:

Net pressure differential driving turbine:

$$\Delta p = p_1 - p_{loss} - p_2 = (1200\times0.09982 - 0.91 - 20)[bar] = 98.9 \ [bar] = 9.89\times10^6 \ [N/m^2].$$

$$\text{Power: } P = \Delta p \times A \times v = 9.89\times10^6 \ [N/m^2] \times 0.1256 \ [m^2] \times 2.21 \ [m/s] = 2.74\times10^6 \ [Nm/s] = 2.74 \ [MW]$$

In the configuration shown in FIG. 1, water is provided from a control facility (4) at the surface of a body of water (sea, lake), with the tube inserted through a well drilled from the sea-bottom to the recipient. The control facility shall typically filter out particulates from the water and control the flow of water in response to electrical power requirements, and may be positioned above or below the water surface, e.g. on the sea-bottom. Clearly, other configurations are possible, with the water being provided from a river or pipeline to a control facility located on dry land.

The vertical hole for the shaft (2) may either be drilled for the sole purpose of creating the power plant, or it may initially have served as part of another enterprise, e.g. oil or gas exploration. In both cases, it must connect with a volumetric recipient (5) that can receive the spent water from the turbine over a significant timespan without filling up with water or creating excessive back pressure. The volume in (5) may take many shapes and shall typically contain permeable structures rather than open voids. As shown in FIG. 1, one or more vertical shafts (6) may assist in pressure relief by enabling trapped liquids or gases to escape, either to the surface or to cavities or permeable layers (7) nearby. Depending on the effective recipient volumetric capacity, i.e. the volume V of water that can be received before back pressure $p_2$ builds up to an unacceptable level, the power generation can continue to deliver for a time T which can be roughly estimated as: $T=V/S$, yielding a cumulative energy of $Q=P\times V/S$ during the lifetime of the installation. In the Example above, an average power $P=2.74$ [MW] shall imply that $S=1000$ [$m^3$/h] must be accommodated in the recipient, corresponding to $8.76\times10^6$ [$m^3$/yr] $=8.76\times10^{-3}$ [$km^3$/yr]. Energy production during a year is then $Q=24$ [GWh].

An important issue is the availability of geological formations that can provide recipients for the spent water. Injection of waste water into porous rock structures deep underground has been practiced for decades in many parts of the world, in connection with oil and mining operations and chemical industries producing contaminated water. As of 2012, there were more than 680,000 injection wells in USA alone. The injected volumes have been very large: Thus, during the past several decades, an accumulated volume of 23 $km^3$ of water has been injected into the Western Canada Sedimentary Basin, and several times this volume has been injected in Texas alone since 1998 (cf. Grant Ferguson "Deep Injection of Waste Water in the Western Canada Sedimentary Basin", Groundwater Vol. 53, No. 2, March-April 2015, pp.187-194). The ability of recipients to receive large volumes of water while avoiding high back pressure to build up has been demonstrated in many cases. Thus, during an injection test at the Collier County South Water Reclamation Facility in Florida, the bottom-hole pressure increase during an injection test was only 0.32 bars at an injection rate of 29,525 [$m^3$/h]. In cases where it is desirable to enhance the drainage capacity of a given well, well known strategies may be implemented as are known from drilling for water and oil, i.e. hydraulic fracking and controlled downhole explosions.

Important issues have centered on avoiding damage to subsurface water resources, leading to requirements that injection wells be located at depths well below aquifers and in zones where leakage to the surface is avoided. This has typically implied a deposition depth of 500 m. to 3500 m.

Generally, the physical implementation of the hydroelectric mode comprises the following steps:
i) Creating a vertical borehole to a point deep underground where the borehole connects with a geological formation capable of receiving a large volume of water.
iii) Arranging for a turbine to intercept water arriving down the borehole.
v) Extracting electrical energy from the turbine via coupling to a generator.

Thermal Mode

The basic principle is illustrated in FIG. 2: Once the recipient (5) is full, further injection of water through the first shaft (2) shall cause water to rise in the second shaft (6).

The rising water is at an elevated temperature reflecting the prevailing temperature in and around the recipient (5). The latter is by design positioned at a depth and in geological environment where temperatures lie in the range 100-250° C. This may imply that the depth h reaches up to 5000-7000 m. The control facility (4) provides a slight overpressure at the cold water injection point of the first shaft (2), which together with the net buoyancy of the hot water column in the second shaft (6) causes hot water to enter a thermopower unit (9). The unit converts thermal energy in the water to electrical energy and delivers it to a transmission line (8), while spent water at a lower temperature is returned to the environment via a tube (10) or recycled via the control unit (4) (not illustrated in FIG. 2).

Figure 3:
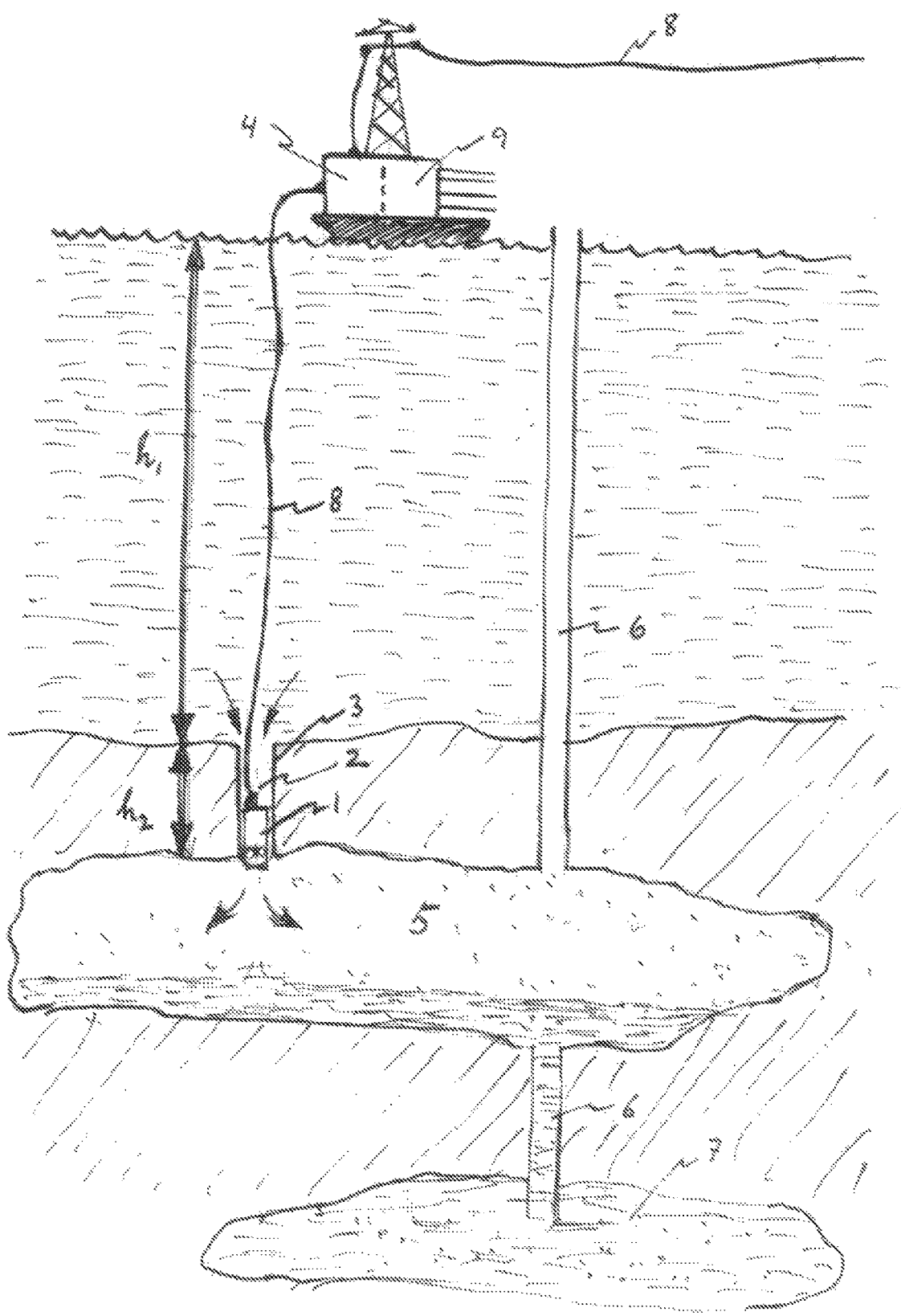
FIG. 3 discloses a second preferred embodiment for generating hydroelectric power.

A second preferred embodiment of the present invention shall now be described with reference to FIG. 3 and FIG. 4:

In the hydroelectric mode, illustrated in FIG. 3, the head of water $h=h_1+h_2$ driving the turbine is made up of two parts, where hi is the sea floor depth below the water surface and $h_2$ is the additional height of the water column in the first shaft (2) extending from the sea floor to the position of the turbine (1), shown at the bottom of the first shaft in FIG. 3. In this case, water flows into the shaft (2) from the surrounding body of water, with the power generation being controlled by a throttle in the turbine or a control unit on the sea bottom directly above the shaft (2) (not shown in FIG. 3). Generated power is transmitted via the control unit (4) on the surface to consumers by means of cables (8).

Figure 4:
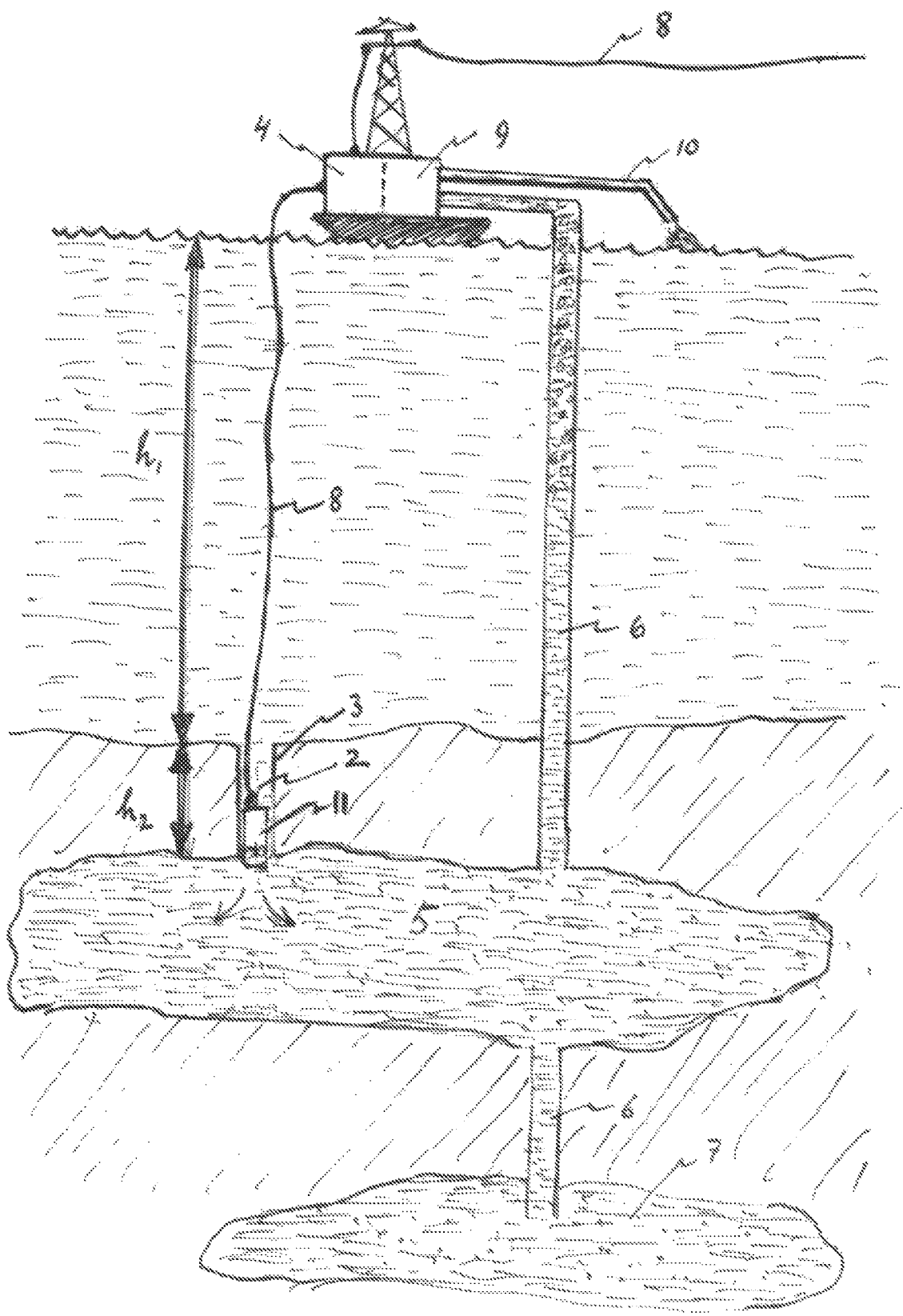
FIG. 4 discloses a second preferred embodiment for extracting geothermal energy.

In the thermal mode, illustrated in FIG. 4, a slight overpressure is maintained in the recipient (5) by means of a pump (11) positioned in the first shaft (2) and supplied with power by means of the cable (8). The pump (11) may either be a device supplanting the turbine (1) or the turbine (1) being run in reverse.

Figure 5:
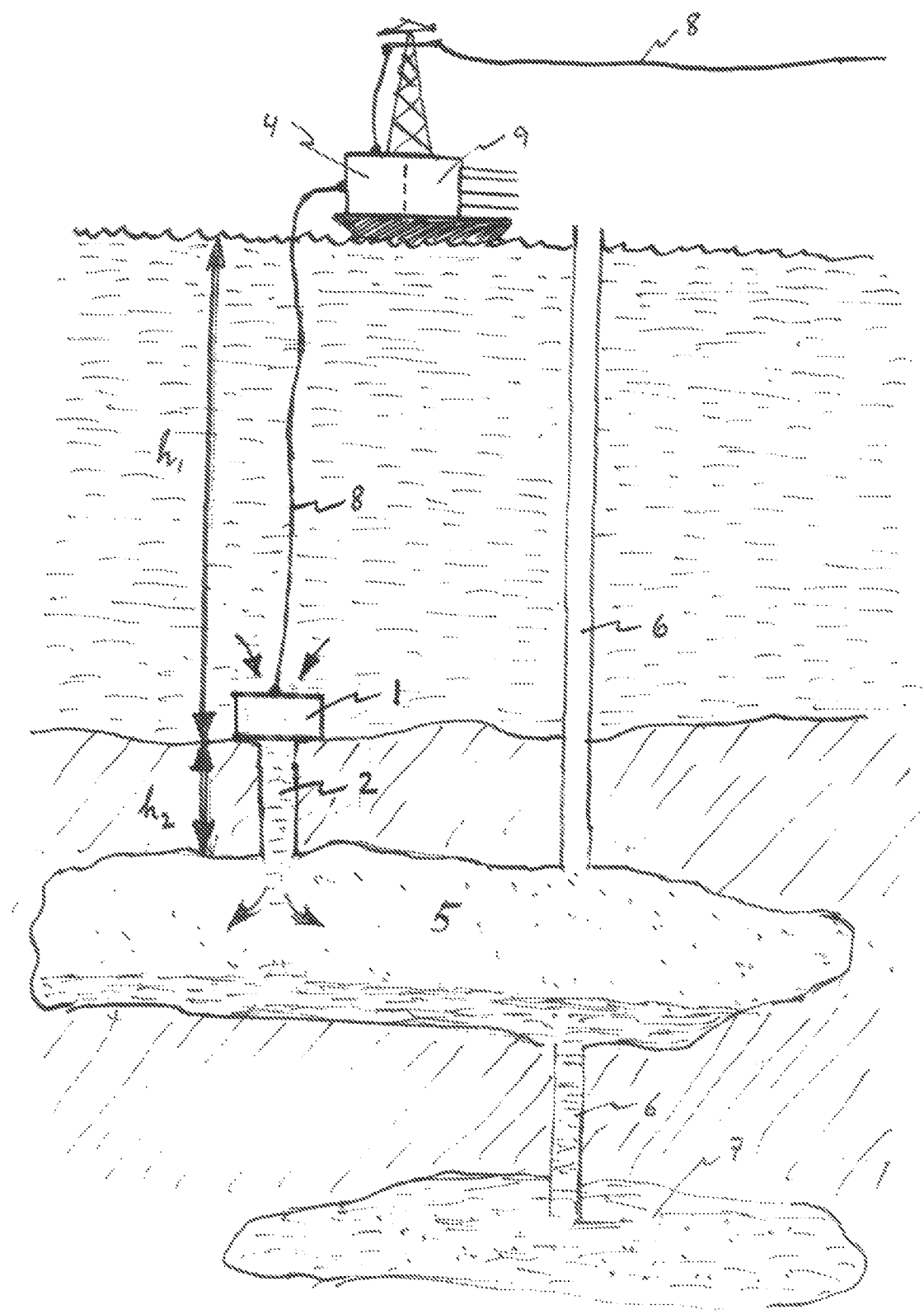
FIG. 5 discloses a third preferred embodiment for generating hydroelectric power.

A third preferred embodiment of the present invention shall now be described with reference to FIG. 5 and FIG. 6:

In the hydroelectric mode, illustrated in FIG. 5, the turbine (1) is positioned on or near the seabed above the opening to a first shaft (2) that communicates between the volume of water above and a recipient (5) below. Water from the surrounding body of water is conducted through the turbine before it enters the shaft (2), and the head of water driving the turbine is $h_1$, corresponding to the sea floor depth below the water surface. Power generation is controlled by a throttle in the turbine (1) or a control unit on the sea bottom directly above the shaft (2) (not shown in FIG. 5).

Generated power is transmitted via the control unit (4) on the surface to consumers by means of cables (8).

Figure 6:
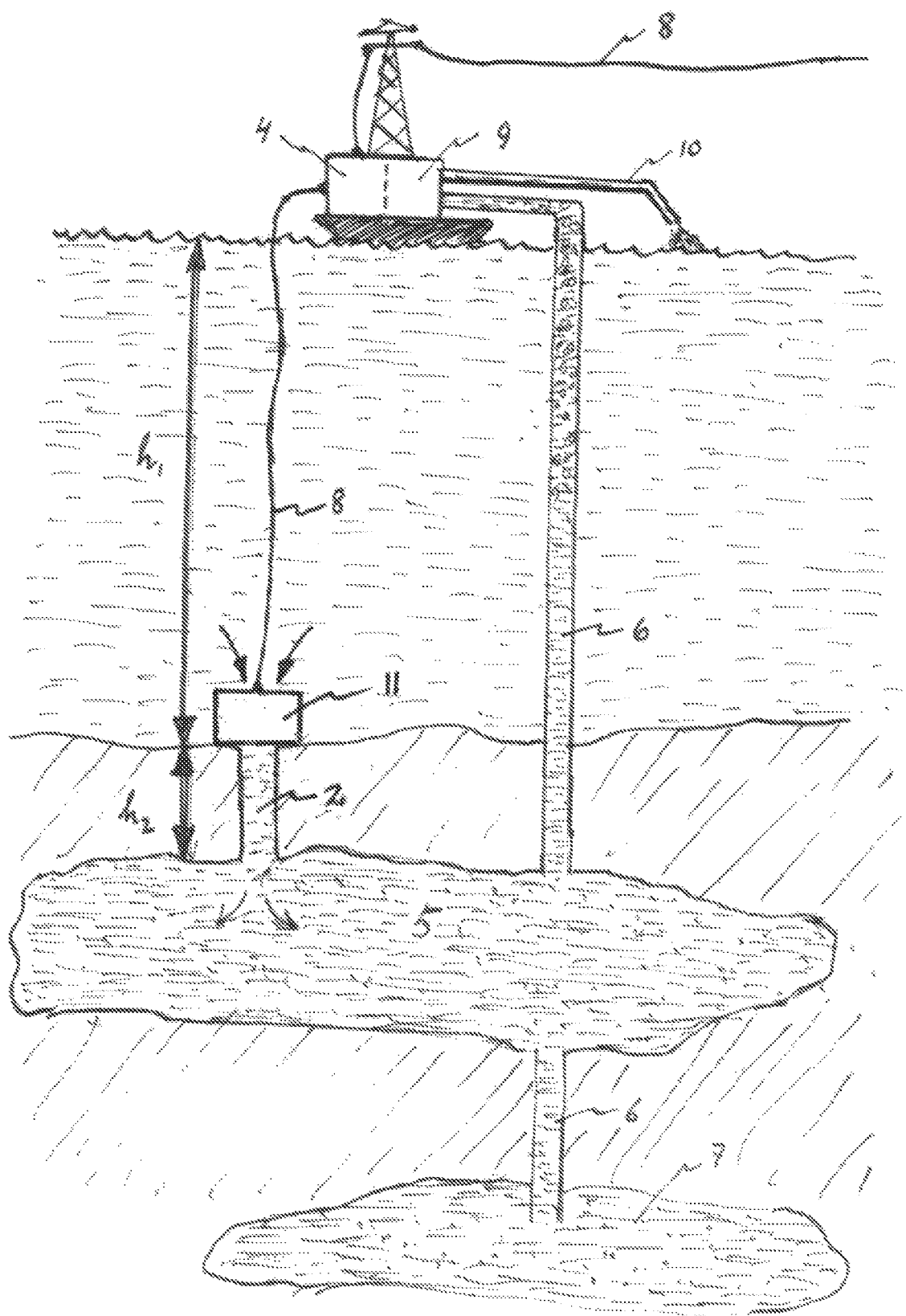
FIG. 6 discloses a third preferred embodiment for extracting geothermal energy.

In the thermal mode, illustrated in FIG. 6, a slight overpressure is maintained in the recipient (5) by means of a pump (11) positioned above the first shaft (2) and supplied with power by means of the cable (8). The pump (11) may either be a device supplanting the turbine (1) or the turbine (1) being run in reverse.

An important feature of the third preferred embodiment is that the turbine (1) and pump (11) no longer are required to fit inside the shaft (2) and thus may be chosen to be any physical size or shape.

A complete operational cycle according to the present invention shall thus evolve as follows:

A hydroelectric mode configuration equivalent to the one shown in FIG. 1 is established, and energy is extracted from the system by injecting water into the first shaft (2).

Energy shall be extracted in the hydroelectric mode until back pressure from the recipient has built up to a level where further operation in this mode is deemed uneconomical. This may take a long time, depending upon the ability of the recipient to absorb and/or store the injected water. In some cases, it may be desirable at a certain point to add sealant material to the injected water in order to stop leakage of water from the recipient and initiate filling, as a preparation for initiating the thermal operation mode.

A thermal mode configuration equivalent to the one shown in FIG. 2 is established, and energy is extracted from the system from the hot water transported to the surface via the second shaft (6). The thermal energy may be used directly for heating purposes, or preferably a heat engine operating at moderate temperature differentials (e.g. $\Delta T=80\text{-}200°$ C.) shall generate electrical power. An important feature of the thermal mode operation as illustrated in FIG. 2 is that the head of water in the first shaft, in combination with the reduced density of the hot water/bubble mixture in the second shaft shall assist substantially in reducing the pumping power required to transport the hot water to the surface.

In conclusion, a system and set of procedures as taught in the present invention shall provide a flexible means of extracting mechanical and thermal energy from deep underground regions, where energy can be generated through all phases by selecting a mode of operation compatible with the situation in each individual case and subsurface conditions as they evolve over time.

The invention claimed is:

1. A method comprising two modes for generating underground energy using water from a water mass above an underground recipient, the method comprising:
   in a hydroelectric mode:
       injecting water into an inlet of a first shaft extending from the water mass to the underground recipient and passing the water through a turbine, wherein, the turbine drives an electrical generator,
       measuring back pressure from the recipient,
       switching to a thermal mode when the back pressure has built up to a defined back pressure level,
   in the thermal mode:
       injecting water into the first shaft, forcing water in the recipient to exit through a second shaft extending from the recipient;
       extracting thermal energy from the water transported via the second shaft heat, by at least one of the following: i) using the water directly for heating purposes, and ii) generating electrical power in a heat engine.

2. The method according to claim 1, wherein the defined back pressure level is the level where further operation in hydroelectric mode is uneconomical.

3. The method according to claim 1, wherein a net pressure differential driving the turbine is a hydrostatic pressure resulting from the water in the first shaft above the turbine minus a frictional pressure drop and minus a back pressure under the turbine from gas or liquid present in the recipient, wherein the method comprises switching to the thermal mode when the net pressure differential is below a defined level.

4. The method according to claim 1, before switching to the thermal mode, verifying that the measured back pressure is maintained, and if it is not, adding sealant material to the water injected in the first shaft to stop leakage from the recipient.

5. The method according to claim 4, wherein the step of verifying comprises estimating the back pressure time gradient based on the measured back pressure, and moving to the step of adding if the back pressure time gradient is above a defined level.

6. The method according to claim 1, wherein the inlet of the first shaft is arranged between the surface and the bottom of the water mass.

7. The method according to claim 6, wherein the inlet of the first shaft is arranged either at the surface or the water bottom.

8. The method according to claim 1, wherein the turbine is arranged either at bottom of the first shaft, in the first shaft or above the first shaft.

9. The method according to claim 1, wherein the step of extracting thermal energy comprises using a thermopower unit arranged either on land or on a floating facility at the surface of the water mass.

10. The method according to claim 1, wherein the thermal mode further comprises:
    condensing water vapor received via the second shaft, to freshwater, and
    collecting the freshwater.

11. The method according to claim 10, wherein the thermal mode further comprises at least one of
    collecting salt for high value use, and
    collecting particulates.

12. Method according to claim 2, wherein a net pressure differential driving the turbine is a hydrostatic pressure resulting from the water in the first shaft above the turbine minus a frictional pressure drop and minus a back pressure under the turbine from gas or liquid present in the recipient, wherein the method comprises switching to the thermal mode when the net pressure differential is below a defined level.

13. The method according to claim 2, before switching to the thermal mode, verifying that the measured back pressure is maintained, and if it is not, adding sealant material to the water injected in the first shaft to stop leakage from the recipient.

14. The method according to claim 3, before switching to the thermal mode, verifying that the measured back pressure is maintained, and if it is not, adding sealant material to the water injected in the first shaft to stop leakage from the recipient.

15. The method according to claim 12, before switching to the thermal mode, verifying that the measured back pressure is maintained, and if it is not, adding sealant material to the water injected in the first shaft to stop leakage from the recipient.

16. The method according to claim 2, wherein the inlet of the first shaft is arranged between the surface and the bottom of the water mass.

17. The method according to claim 3, wherein the inlet of the first shaft is arranged between the surface and the bottom of the water mass.

18. The method according to claim 12, wherein the inlet of the first shaft is arranged between the surface and the bottom of the water mass.

19. The method according to claim 4, wherein the inlet of the first shaft is arranged between the surface and the bottom of the water mass.

20. The method according to claim 13, wherein the inlet of the first shaft is arranged between the surface and the bottom of the water mass.

\* \* \* \* \*